United States Patent [19]

Breeland, Jr. et al.

[11] Patent Number: 4,807,734
[45] Date of Patent: Feb. 28, 1989

[54] PELLET-PRESS-TO-SINTERING-BOAT NUCLEAR FUEL PELLET LOADING APPARATUS

[75] Inventors: Fred S. Breeland, Jr.; Thomas B. Huggins, both of Columbia, S.C.

[73] Assignee: Westinghouse Electric Corp., Pittsburgh, Pa.

[21] Appl. No.: 77,347

[22] Filed: Jul. 24, 1987

[51] Int. Cl.$^4$ .............................................. B65G 47/44
[52] U.S. Cl. ...................................... 193/32; 193/40; 198/453; 198/534; 198/956; 53/248; 221/312 R
[58] Field of Search ...................... 193/31 R, 31 A, 32, 193/33, 38–40; 53/245, 246, 248; 221/307, 310, 312 R; 414/35, 748; 198/396, 443, 453, 534, 956

[56] References Cited

U.S. PATENT DOCUMENTS

| | | | |
|---|---|---|---|
| 1,015,937 | 1/1912 | Brevetti et al. | |
| 1,375,988 | 4/1921 | Walter | |
| 2,896,384 | 7/1959 | Carlsen et al. | 53/245 X |
| 3,034,626 | 5/1962 | Kay | 193/32 |
| 3,066,827 | 12/1962 | Pryor | 221/312 R |
| 3,907,128 | 9/1975 | Cathers | 414/35 |
| 3,970,218 | 7/1976 | Lee | 198/396 X |
| 4,122,933 | 10/1978 | Starzyk | |
| 4,243,078 | 1/1981 | Sahlin | |
| 4,332,120 | 6/1982 | Haynes et al. | |
| 4,340,323 | 7/1982 | Bankes | |
| 4,476,670 | 10/1984 | Ukai et al. | |
| 4,566,835 | 1/1986 | Raymond et al. | |
| 4,573,847 | 3/1986 | Howell et al. | 414/748 X |
| 4,642,016 | 2/1987 | Bucher | |
| 4,765,453 | 8/1988 | Bucher | 53/248 X |

Primary Examiner—Robert J. Spar
Assistant Examiner—Lyle Kimms

[57] ABSTRACT

Apparatus for loading friable nuclear fuel pellets into a sintering boat from a pellet press which ejects newly made pellets. An inclined pellet chute (preferably a tube) receives the ejected pellets and discharges them against a first resilient brush which reflects the pellets downwardly to a second resilient brush. The brush tips are spaced apart such that a pellet moving downward along the second brush contacts the flexible brush tip of the first brush before dropping off the second brush (preferably with near-zero velocity) into the sintering boat.

10 Claims, 2 Drawing Sheets

PELLET-PRESS-TO-SINTERING-BOAT NUCLEAR FUEL PELLET LOADING APPARATUS

CROSS-REFERENCE TO RELATED APPLICATIONS

Reference is hereby made to the following copending applications dealing with related subject matter and assigned to the assignee of the present invention:

1. "Apparatus For Unloading Nuclear Fuel Pellets From A Sintering Boat" by George D. Bucher et al., assigned U.S. Ser. No. 637,371 and filed Aug. 3, 1984, now U.S. Pat. No. 4,642,016.

2. "A Pellet-Press-To-Sintering-Boat Nuclear Fuel Pellet Loading System" by George D. Bucher, assigned U.S. Ser. No. 043,059 and filed Apr. 27, 1987, now U.S. Pat. No. 4,765,453.

BACKGROUND OF THE INVENTION

1. Field of the Invention:

The present invention relates generally to handling nuclear fuel pellets and, more particularly, is concerned with an apparatus for loading newly made (green) friable nuclear fuel pellets into sintering boats from a pellet press.

2. Description of the Prior Art:

An operational step in the nuclear fuel fabrication process is the loading of friable nuclear fuel pellets, which have been ejected from the die table surface of a pellet press, into sintering boats (containers) in preparation for high temperature firing of the pellets in a sintering furnace. This operation requires careful handling of the pellets, because the pre-sintered pellets are easily crumbled.

Typical nuclear fuel pellet loading devices are disclosed in U.S. Pat. Nos. 4,332,120 and 4,566,835, both hereby incorporated by reference. The loader described in U.S. Pat. No. 4,332,120 employs a vertical chute which has a set of zig-zag inclined plates to guide the pellets into a boat which rests on a spring-biased platform. The loader described in U.S. Pat. No. 4,566,835 employs a horizontally disposed drum which receives a line of pellets into a vertically aligned lengthwise channel and which discharges the line of pellets into a boat when the drum rotates the channel to a below horizontal position.

It is known in the prior art to load nuclear fuel pellets into a sintering boat by a gravity discharge from the pellet press down an inclined chute (having perpendicular sides) into the boat. Pellet impeding devices (such as feeler stock and paint brushes) hanging vertically down onto the pellet path along the chute have been generally unsuccessful in reducing pellet impact.

What is needed is an economical, soft-pellet-handling sintering boat pellet loader, one which releases the pellets with near-zero velocity above the sintering boat, and one which operates passively without motorized arrangements and simply without a multiplicity of parts.

SUMMARY OF THE INVENTION

It is an object of the invention to provide a soft-handling apparatus for loading nuclear fuel pellets into a sintering boat from a pellet press.

It is another object of the invention to provide such an apparatus which releases the pellets with near-zero velocity above a sintering boat.

It is a further object of the invention to provide an economical said apparatus without motorized arrangements or a multiplicity of parts.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the apparatus, for loading nuclear fuel pellets into a sintering boat from a pellet press which ejects newly made pellets from the pellet press rotating die table surface, includes an inclinable pellet chute, having a straight centerline, and first and second members each with a resilient planar surface having an upper supported terminus and a lower free terminus. The chute's upper end is positionable, for receiving ejected pellets, near the press's die table surface, and the chute's lower end is positionable, for discharging the received pellets, near the sintering boat. The first member's surface is positioned so that a discharged pellet will strike and reflect downwardly off such surface. The second member's surface, which is oriented parallel to the chute's centerline, is positioned such that downwardly reflected pellet will strike and move downwardly along such surface. The lower ends of the surfaces are positioned so that a downwardly moving pellet on the second surface will contact the flexible lower end of the first surface before the pellet drops off the second surface's lower end into the sintering boat.

In a preferred embodiment of the invention, brushes define the surfaces of the first and second members.

In an exemplary embodiment of the invention, the rigid backing material is attached to the brushes.

Several benefits and advantages are derived from the invention. The chute and brush features together provide a soft-handling pellet transfer without motorized arrangements or a multiplicity of parts. The two-brush feature provides pellet deceleration through the pellet's alternate contact with the brushes followed by a further slowing of the pellet, before release, through the pellet's simultaneous contact with the brushes' free ends.

DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
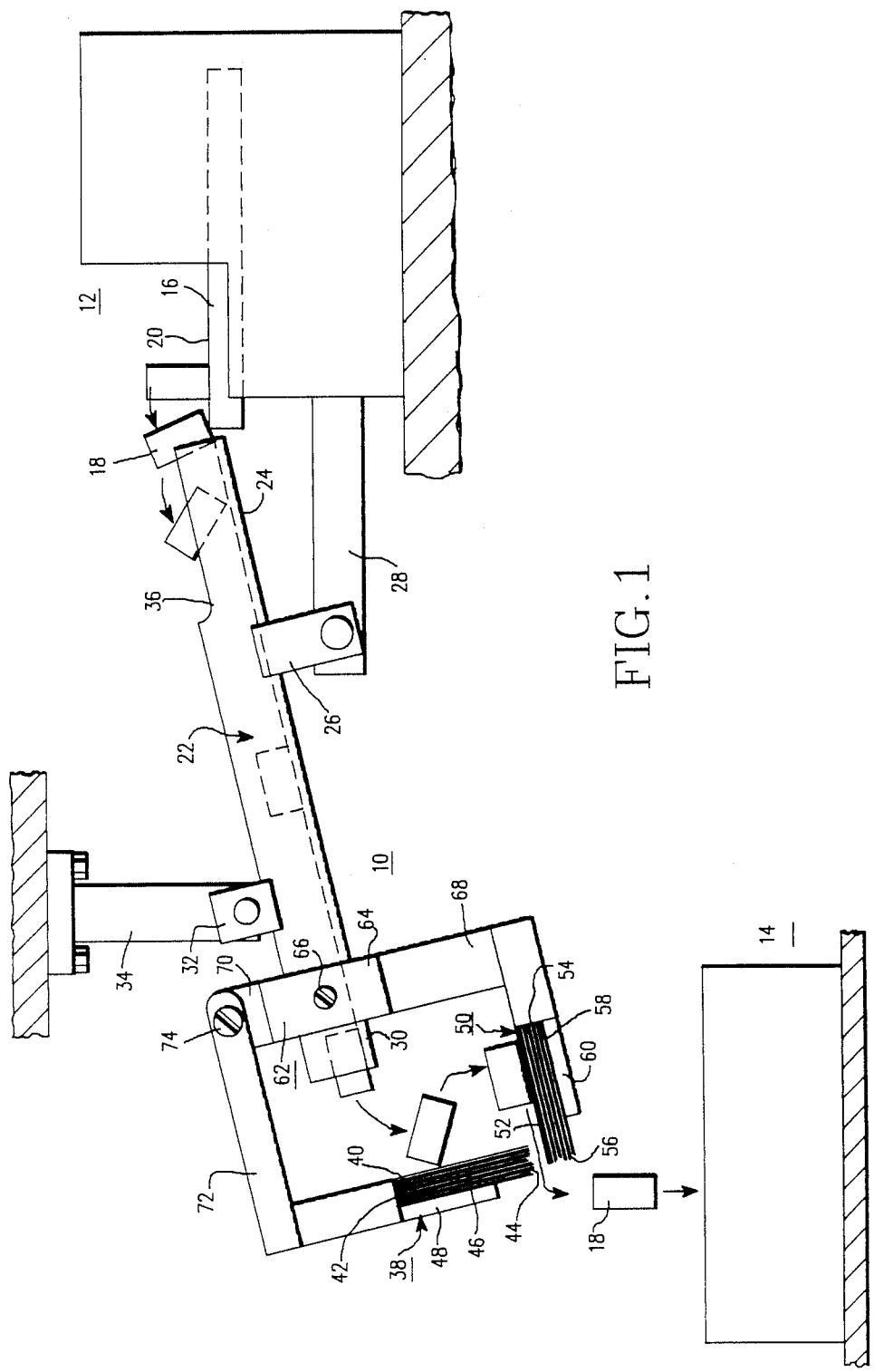
FIG. 1 is an elevational side view of the fuel pellet loading apparatus of the invention plus the pellet press and the sintering boat.

Reference will now be made in detail to several present preferred embodiments of the invention, some examples of which are illustrated in the accompanying drawings. In the drawings, like reference characters designate like or corresponding parts throughout the several views.

Nuclear fuel pellets typically have a right circular cylindrical shape, a length of about 0.7 to 2.1 centimeters, and a diameter of about 0.6 to 1.3 centimeters. They usually are made from uranium dioxide powder which has been pressed into pellet form by a commercially available pellet press. The press normally has a rotating die table containing bores into which the powder is placed. Top and bottom punches compact the powder in the bore to fabricate the pellet. The top punch is withdrawn, and the bottom punch is raised to present a newly made pellet flush with the die table surface. The pellet is ejected from the die table surface when it encounters a stationary pellet-exiting shoe, which is part of the pellet press.

Newly made pellets (sometimes called "green" pellets) are easily crumbled and therefor susceptible to damage during pellet handling, such as when they are loaded into sintering boats. The boats are containers which carry the pellets to a furnace for a pellet sintering operation. The pellets eventually are sealed in fuel rods which are grouped into fuel assemblies which are loaded into the core of a nuclear reactor. A liquid moderator/coolant, such as water, is pumped through the core of the reactor and directed to pass along the fuel rods of the fuel assembly in order to extract heat generated therein by the fuel pellets for the production of useful work, such as the generation of electrical power.

Figure 2:
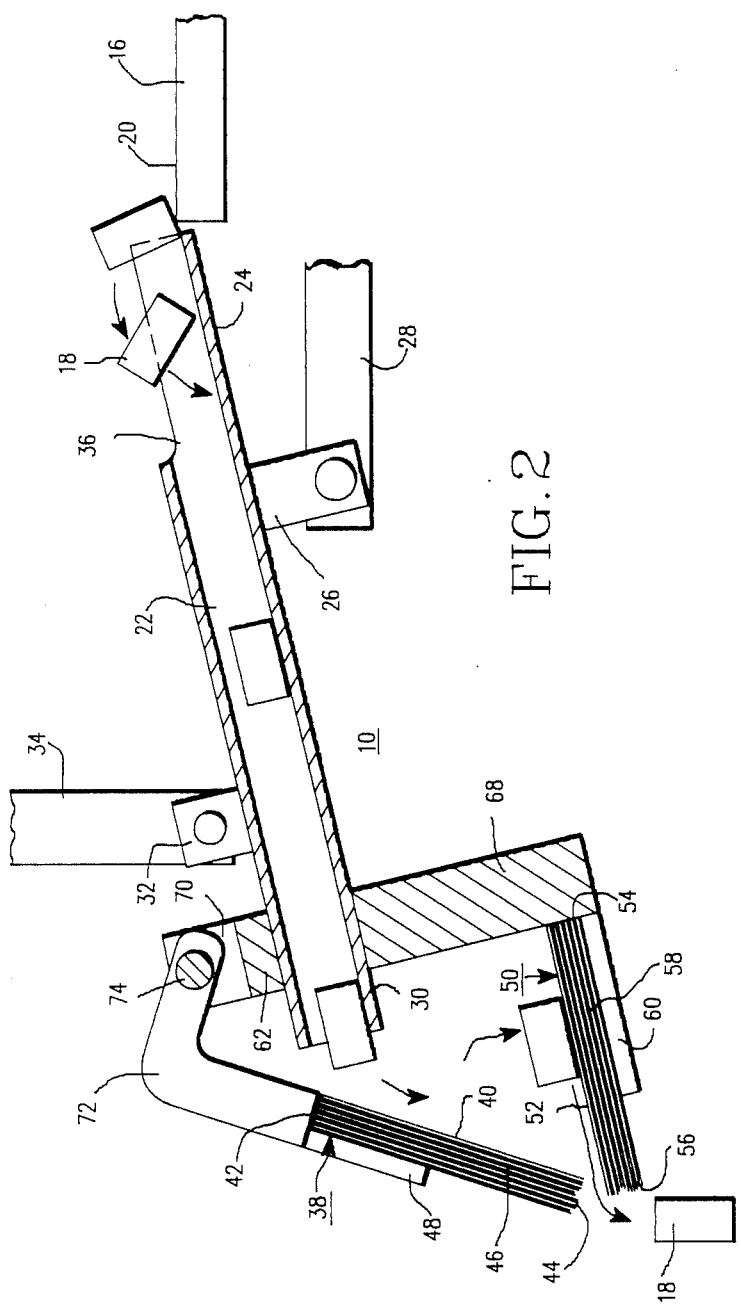
FIG. 2 is a cross-sectional view, taken along a vertical plane passing through the centerline of the chute, of the apparatus of FIG. 1 showing a forty-five (instead of ninety) degree brush angle embodiment.

Returning to the pellet-press-to-sintering-boat portion of the fuel fabrication process, the nuclear fuel pellet loading apparatus 10 of the invention, along with a pellet press 12 and a sintering boat 14, is shown in FIG. 1, while another embodiment of the pellet loading apparatus 10 is shown alone in FIG. 2. A typical pellet press die table 16 is 45.7 centimeters in diameter, has sixteen pellet-forming stations (or bores, not shown), and rotates at seventeen revolutions per minute. Therefore, the newly made pellets 18 are ejected from the surface 20 of the die table 16 by a stationary pellet-exiting shoe (not shown) at a rate of 272 pellets per minute or close to 5 pellets per second. Typical pellet production rates for pellet presses range from 160 to 360 pellets per minute.

The pellet loading apparatus 10 includes a pellet chute having a generally straight centerline. Preferably, the chute is a stainless steel or polyvinyl chloride (PVC) tube 22 which is inclinable and has a polished inside surface so that pellets 22 may easily slide therethrough without damage. The tube's upper end 24 is disposable proximate the pellet press's die table surface 20 to receive the pellets 18 ejected therefrom. For example, the tube 22 can include an upper attachment boss 26, near the bottom part of the tube's upper end 24, which is connected to a stationary portion of the pellet press 12 by a horizontal attachment bar 28. The tube's lower end 30 is disposable proximate the sintering boat 14 to discharge the received pellets. For example, the tube 22 can include a lower attachment boss 32, near the top part of the tube's lower end 30, which is connected to a fixed vertical overhang by a vertical attachment bar 34. Typically the tube 22 is inclined at an angle between about twenty to thirty degrees from the horizontal. The attachment of the tube may be adjustable for tube angle by, for example, making the horizontal and vertical attachment bars 28 and 34 telescoping to vary their lengths. Other tube positioning and angle varying arrangements are possible, as is known to those skilled in the art. In an exemplary embodiment, the upper end 24 of the tube 22 includes an open top portion 36 to facilitate receipt of the pellets 18. In a typical application, the tube is 45 centimeters long with an inside diameter of 2.09 centimeters. A pellet 18 entering the upper end 24 of the tube 22 may do so with a motion that causes it to go partially up the side of the tube before settling into a straight line path along the bottom of the tube prior to being discharged from the tube's lower end 30. The tube's curved inside surface insures soft pellet handling during such motion, as can be appreciated by those skilled in the art.

The pellet loader 10 also includes a first member 38 with a first resilient and generally planar surface 40, wherein the first surface 40 has a first upper supported terminus 42 and a flexible first lower free terminus 44, and the first surface 40 is disposed so that a pellet 18 discharged from the tube 22 will strike and reflect downwardly off the first surface 40. Preferably, the first surface 40 is so disposed to reflect the pellet 18 downwardly in a generally vertical plane passing through the tube's centerline by being positioned generally perpendicular to said plane. In an exemplary embodiment, the first surface 40 is oriented at an angle from about forty-five to about ninety degrees from the tube's centerline. Ninety degrees will accommodate slow pellet rates up to about three pellets per second, while the preferred forty-five degrees also will accommodate faster pellet rates up to about six pellets per second, all without inter-pellet contact.

In a favored embodiment, the first member 38 includes a first brush 46 (such as a nylon bristle paint brush) defining the first surface 40, and a rigid backing material 48 (such as a metal plate) attached to the first brush 46. The backing material 48 is not attached to the tip of the first brush 46 so that the tip (the first lower terminus 42 of the first surface 40) will be flexible.

The pellet loader 10 additionally includes a second member 50 with a second resilient and generally planar surface 52, wherein the second surface 52 has a second upper supported terminus 54 and a (preferably flexible) second lower free terminus 56. The second surface 52 is oriented generally parallel to the tube's centerline and is disposed so that a pellet 18 reflected downwardly off the first surface 40 will strike and move downwardly along the second surface 52. Preferably, the second surface 52 is so disposed to move the pellet 18 downwardly in a generally vertical plane passing through the tube's centerline by being positioned generally perpendicular to said plane. The second surface's lower terminus 56 is disposed with respect to the first surface's lower terminus 44 so that a pellet 18 moving downwardly along the second surface 52 will contact the first surface's lower terminus 44 before dropping off the second surface's lower terminus 56 into the sintering boat 14.

In an exemplary embodiment, the second member 50 includes a second brush 58 (such as a nylon bristle paint brush) defining the second surface 52, and a rigid backing material 60 (such as a metal plate) attached to the second brush 58. Preferably, the backing material 60 is not attached to the tip of the second brush 58 so that the tip (the second lower terminus 56 of the second surface 52) will be flexible.

Preferably, the pellet-press-to-sintering-boat pellet loading apparatus 10 also includes a brush-holding fixture 62 attached to the tube 22 near its lower end 30.

The fixture 62 includes a collar portion 64, coaxially surrounding the tube 22, and one or more set screws 66 to secure the collar portion 64 to the tube 22. The collar portion 64 includes a lower projection 68 to which the second brush's upper terminus 54 is attached and an upper projection 70 to which an arm member 72 of the fixture 62 is pivotally secured by a bolt 74. The first brush's upper terminus 42 is attached to the free end of the arm member 72. It is noted that the set screw 66 allows the distance of the brushes 46 and 58, along an axis coincident with the tube's centerline, to be varied. Likewise, the bolt 74 allows the angle of the first brush 46, from the tube's centerline, to be varied.

As can be appreciated by those skilled in the art, the flexibility and separation distance of the tips of the brushes 46 and 58 may be chosen so that a pellet 18 moving downwardly along the second brush 58 will contact the tip of the first brush 46 (i.e., the first lower terminus 44 of the first surface 40) resulting in near-zero velocity when the pellet 18 drops off the second brush 58 (i.e., the second surface 52) into the sintering boat 14.

The above-described elements of the pellet loading apparatus 10 work together to provide a gentle, controlled transfer of fragile, as pressed, nuclear fuel pellets 18 from the press die table 16 to the sintering boat 14. It is clear that the dimensions of the elements, such as the length and slope of the tube 22, the size and tip separation distance of the brushes 46 & 58, etc. are to be chosen to best meet the demands of the particular pellet press, pellet size, etc., as is within the purview of those skilled in the art.

It will be apparent that many modifications and variations are possible in light of the above teachings. It, therefore, is to be understood that within the scope of the appended claims, the invention may be practiced other than as specifically described.

We claim:

1. An apparatus for loading nuclear fuel pellets into a sintering boat from a pellet press which ejects newly made said pellets from a pellet press rotating die table surface, said apparatus comprising:
   (a) an inclinable pellet chute having a generally straight centerline, an upper end disposable proximate said die table surface of said pellet press for receiving ejected said pellets, and a lower end disposable proximate said sintering boat for discharging the received said pellets;
   (b) a first member with a first resilient and generally planar surface having a first upper supported terminus and a flexible first lower free terminus, said first surface disposed such that said pellet discharged from said chute will strike and reflect downwardly off said first surface; and
   (c) a second member with a second resilient and generally planar surface having a second upper supported terminus and a second lower free terminus, said second surface oriented generally parallel to the centerline of said chute and disposed such that said pellet reflecting downwardly off said first surface will strike and move downwardly along said second surface, and said second lower terminus of said second surface disposed with respect to said first lower terminus of said first surface such that said pellet moving downwardly along said second surface will contact said first lower terminus of said first surface before dropping off said second lower terminus of said second surface into said sintering boat.

2. The apparatus of claim 1, wherein said chute is a tube.

3. The apparatus of claim 2 wherein said upper end of said tube includes an open top portion.

4. The apparatus of claim 1, wherein said first surface is oriented at an angle from about forty-five to about ninety degrees from the centerline of said chute.

5. The apparatus of claim 4, wherein said first surface is oriented at an angle of about forty-five degrees from the centerline of said chute.

6. The apparatus of claim 1, wherein said second lower terminus of said second surface is flexible.

7. The apparatus of claim 6, wherein said first member includes a first brush defining said first surface and said second member includes a second brush defining said second surface.

8. The apparatus of claim 7, wherein said first member includes a rigid backing material attached to said first brush and said second member includes a rigid backing material attached to said second brush.

9. The apparatus of claim 7, also including a brush-holding fixture attached to said chute proximate its said lower end, with said first upper terminus of said first brush and said second upper terminus of said second brush attached to said fixture, and with said fixture adjustable to vary the distance of said brushes along an axis coincident with the centerline of said chute and adjustable to vary the angle of said first brush from the centerline of said chute.

10. The apparatus of claim 9, wherein said chute is a tube whose said upper end includes an open portion, wherein said first surface is oriented at an angle of about forty-five degrees from the centerline of said tube, and wherein said first and second members include rigid backing material attached to said first and second brushes, respectively.

* * * * *